(12) United States Patent
Abe et al.

(10) Patent No.: US 9,373,432 B2
(45) Date of Patent: Jun. 21, 2016

(54) ALCOHOLIC SOLUTION AND SINTERED MAGNET

(71) Applicant: Hitachi Chemical Company, Ltd., Shinjuku-ku, Tokyo (JP)

(72) Inventors: Nobuo Abe, Saitama (JP); Yuichi Satsu, Hitachi (JP); Matahiro Komuro, Hitachi (JP); Takayuki Kanda, Nagaokakyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 643 days.

(21) Appl. No.: 13/677,472

(22) Filed: Nov. 15, 2012

(65) Prior Publication Data

US 2013/0126775 A1    May 23, 2013

(30) Foreign Application Priority Data

Nov. 17, 2011    (JP) .................................. 2011-251206

(51) Int. Cl.

| | |
|---|---|
| *H01F 1/01* | (2006.01) |
| *B82Y 30/00* | (2011.01) |
| *B22F 1/00* | (2006.01) |
| *C22C 33/02* | (2006.01) |
| *C22C 38/00* | (2006.01) |
| *H01F 1/057* | (2006.01) |
| *H01F 41/02* | (2006.01) |
| *B82Y 25/00* | (2011.01) |
| *B22F 9/24* | (2006.01) |

(52) U.S. Cl.
CPC ................ *H01F 1/01* (2013.01); *B22F 1/0018* (2013.01); *B82Y 30/00* (2013.01); *C22C 33/02* (2013.01); *C22C 38/002* (2013.01); *C22C 38/005* (2013.01); *H01F 1/0579* (2013.01); *B22F 9/24* (2013.01); *B82Y 25/00* (2013.01); *C22C 2202/02* (2013.01); *H01F 1/0577* (2013.01); *H01F 41/0293* (2013.01); *Y10S 977/773* (2013.01); *Y10S 977/81* (2013.01)

(58) Field of Classification Search
CPC .......................................................... H01F 1/01
USPC ................................................... 148/100–101
See application file for complete search history.

(56) References Cited

U.S. PATENT DOCUMENTS

| | | | |
|---|---|---|---|
| 7,696,662 B2 | 4/2010 | Komuro et al. | |
| 7,972,450 B2 | 7/2011 | Komuro et al. | |
| 7,988,795 B2 | 8/2011 | Hirota et al. | |
| 8,222,785 B2 | 7/2012 | Komuro et al. | |
| 2007/0240789 A1* | 10/2007 | Nakamura et al. | ............ 148/101 |
| 2011/0240909 A1 | 10/2011 | Kanda et al. | |

FOREIGN PATENT DOCUMENTS

| | | |
|---|---|---|
| CN | 102208235 A | 10/2011 |
| JP | 2007-157903 A | 6/2007 |
| JP | 2008-60183 A | 3/2008 |

OTHER PUBLICATIONS

Chinese Office Action dated Feb. 5, 2015 with English translation (11 pages).

* cited by examiner

*Primary Examiner* — Jessee Roe
(74) *Attorney, Agent, or Firm* — Crowell & Moring LLP

(57) ABSTRACT

The purpose of the present invention is to provide an alcoholic solvent, in which FeCo-based particles becoming a soft magnet are improved, for enhancing properties of a magnetic material using no heavy rare earth elements, and is to provide a sintered magnet produced by using it.

6 Claims, 2 Drawing Sheets

⊢ 200 nm 2.0 μm

ALCOHOLIC SOLUTION AND SINTERED MAGNET

FIELD OF THE INVENTION

The present invention relates to an alcoholic solution and a sintered magnet.

BACKGROUND OF THE INVENTION

Patent Literatures 1 and 2 disclose a magnet prepared by sintering a composite magnetic material of hard magnetic particles containing a rare earth (such as NdFeB and SmCo) and soft magnetic particles such as a FeCo alloy. Patent Literature 1 discloses that a phase composed of rare earth oxygen fluorine is formed at a grain boundary in a rare earth iron boron based sintered magnet. Patent Literature 2 discloses a composite material in which a fluorine compound exists between NdFeB based magnetic powders and Fe powders.

CITATION LIST

Patent Literature

[Patent Literature 1] JP 2007-157903 A
[Patent Literature 2] JP 2008-60183 A

BRIEF SUMMARY OF THE INVENTION

A FeCo based alloy having a body-centered cubic structure (BCC) structure becomes a soft magnetic material showing the highest saturation magnetic flux density in stable and bulkable materials. The saturation magnetic flux density of $Fe_{70}Co_{30}$ is 2.4 T which is more than a value of $Nd_2Fe_{14}B$ (1.61 T) of a hard magnetic material. A composite material, in which a FeCo alloy showing such a high saturation magnetic flux density is magnetically coupled with $Nd_2Fe_{14}B$, is suggested and is developed as a nanocomposite magnet or a hot formed magnet for the purpose of a high energy product. However, a nanocomposite magnet is produced by a melt-spinning method (rapid cooling solidification method), and rapidly cooling solidified magnetic powers easily produce a crystal grain growth and a diffusion reaction with a heating and cannot be applied to a sintering step. Therefore, it is difficult to apply to a sintered magnet in which magnetic properties are deteriorated at a sintering temperature, a magnetic powder occupancy ratio is 95% or more, and has an anisotropy.

The above conventional invention achieves a high energy product by forming a fluorine-containing grain boundary phase between a rare earth iron based crystal grain and an iron cobalt alloy crystal grain and exhibiting a magnetic coupling in an iron cobalt alloy crystal grain and a rare earth iron based crystal grain having a rare earth element unevenly distributed. Further, this composite material based one has features that hard magnetic particles having a relatively large size of μm order and soft magnetic particle having a size of nm order are mixed to form a composite magnetic material to be used, but not a melt-spinning method. This composite magnetic material can be sintered, and a sintered magnet having an increased magnetic powder occupancy ratio and an anisotropy can be produced.

In order to enhance properties of a magnetic material using no heavy rare earth elements, the purpose of the present invention is to provide an alcoholic solvent, in which FeCo based particles becoming a soft magnetic material are improved, and is to provide a sintered magnet produced by using it.

The present invention provides:

[1] an alcoholic solution comprising FeCo-based particles and rare earth fluoride mixed together,
wherein particle diameters of said FeCo-based particles are larger than particle diameters of said rare earth fluoride particles,
particle diameters of said FeCo-based particles are from 20 to 200 nm, and
particle diameters of said rare earth fluoride particles are from 1 to 50 nm,
[2] The alcoholic solution according to [1], comprising said FeCo-based particles in an amount of from 1 to 50 wt % and said rare earth fluoride particles in an amount of from 0.001 to 10 wt %,
[3] The alcoholic solution according to [1], wherein from 1 to 90% of said rare earth fluoride particles are amorphous,
[4] The alcoholic solution according to [2], wherein from 1 to 90% of said rare earth fluoride particles are amorphous,
[5] The alcoholic solution according to [3], wherein said FeCo-based particles are crystalline,
[6] The alcoholic solution according to [4], wherein said FeCo-based particles are crystalline,
[7] A sintered magnet which is produced by mixing and sintering $Nd_2Fe_{14}B$-based powder and the alcoholic solution according to [1],
[8] The sintered magnet according to [7], wherein the sintered magnet has Fe in amount of from 0.2 to 50% and Co in amount of from 0.1 to 50% at a grain boundary phase between the $Nd_2Fe_{14}B$-based particles and the FeCo-based particles.

A slurry comprising FeCo-based particles and a fluoride solution mixed together preferably contains, in an alcohol solvent, FeCo-based particles in an amount of from 1 to 50 wt % and rare earth fluoride particles in an amount of from 0.001 to 10 wt %, wherein particle diameters of the FeCo-based particles are from 20 to 200 nm and particle diameters of the rare earth fluoride particles are from 1 to 50 nm. A sintered magnet is produced by mixing the slurry with and $Nd_2Fe_{14}B$-based powder, molding it in a magnetic field and then sintering it.

It should be further understood by those skilled in the art that although the foregoing description has been made on embodiments of the invention, the invention is not limited thereto and various changes and modifications may be made without departing from the spirit of the invention and the scope of the appended claims.

Advantageous Effects of Invention

The sintered magnet prepared by using the alcoholic solution of the present invention has a decreased amount of rare earth elements used, and can achieve increases of Curie point and an energy product of a magnet. In addition, the FeCo based particles produced by the present invention have good frequency characteristics at a high frequency band of GHz or more, and can be also applied to a magnetic loss material having a high electromagnetic wave absorptance.

DETAILED DESCRIPTION OF THE INVENTION

Figure 1:
FIG. 1 is a scanning electron microscopic picture of FeCo-based particles obtained at Example 1.

Embodiments for carrying out the present invention are explained below. The present invention has the following features: (1) FeCo-based particles, which are main components of a sintered magnet, have a composition of $Fe_xCo_{1-x}$ (0.25<x<0.55), (2) FeCo-based particles, which are main components of a sintered magnet, have a bcc structure, (3) in addition to the above main components, a ferrite component is contained, and FeCo-based particles, which are main components of a sintered magnet, occupy from 90 to 99% or more in total, (4) a rare earth fluoride is coated on surfaces of FeCo-based particles (coverage is 50% or more), (5) Curie point is 900° C. or more, (6) a minor axis is from 10 to 300 nm, (7) an aspect ratio (D/d) is from 5 to 50, (8) a coefficient of variation (standard deviation/average particle size× 100)<15%, and (9) the sintered magnet is produced by mixing a fluoride solution with a slurry containing particles of a FeCo alloy prepared by a wet method, subjecting to an orientation in a magnetic field, and then sintering it.

In order that FeCo-based particles exhibit good properties as a composite magnetic material, it is necessary to be $Fe_xCo_{1-x}$ (0.25<x<0.55), because a Fe simple substance has a low transition temperature at a α-γ phase and a decreased Curie point. In the meantime, it is known that a FeCo alloy shows a higher magnetic flux saturation density than in a Co simple substance. Although it is originally desired that a crystal structure is a bct (body-centered tetragonal) structure having a high crystal magnetic field anisotropy, it is not reported at present that a FeCo alloy having a stable bct structure was synthesized. In the meantime, it is clear that a bcc structure shows the highest saturation magnetic flux density in bulkable materials, and the bcc structure is synthesized also in the process used in the present invention.

In the synthesis, when conditions satisfying a reduction are not complete, a ferrite component, which lowers a magnetic flux saturation density, can be produced due to a disproportionation reaction. Additionally, also in reactions other than a disproportionation reaction, there is possibility that minute metal particles are oxidized all the time. Also thereby, a ferrite component is produced. But, the ferrite component can be reduced by aging it at from 300° C. to 500° C. in a hydrogen atmosphere. Further, since an oxide such as TbOF, NdOF and a rare earth rich phase can be formed at a vicinity of a crystal grain boundary of soft magnetic particles and hard magnetic particles, the ferrite component can be contained in amount of about 10%.

In case that FeCo-based particles are spherical, the particle size is preferably about 20 nm or more. In case being less than the range, it is know that they approach an ultra magnetic size and contrarily a magnetic flux saturation density becomes lowered. In the meantime, as the particles are smaller, it becomes more difficult to coat-treat it with a rare earth fluoride solution in addition to controls of an agglomeration and oxidation during a storage and recovery of particles after synthesis. Thus, in the present invention, it is preferred that a minor axis is from 10 to 300 nm and an aspect ratio is from 5 to 50.

In the present invention, a magnetic field anisotropy derived from a crystal structure of FeCo-based particles cannot be expected. Thus, in order to enhance a squareness (residual magnetization density/magnetic flux saturation density) of a hysteresis loop and anisotropy energy as a whole magnet after sintering or an orientation property, it is preferred that soft magnetic particles have a shape in the form of needle and an aspect ratio thereof is from 5 to 50.

By pulverizing FeCo-based particles prepared by a rapid cooling method or agglomerated FeCo-based particles, it is known that oblate-shaped particles are obtained and these particles have a high aspect ratio. However, a shape of particles of a hard magnetic material has no specific characteristics, and an oblate shape three-dimensionally deteriorates an orientation property, and thus the form of needle is used.

The present invention is synthesized by a liquid phase method (wet method). Usually, it is understood that a nanoparticle synthesis by CVD (Chemical Vapor Deposition) is preferable because of minute particle size and no impurities contained. However, CVD causes problems of an oxidation or agglomeration during a storage and recovery of particles. In respect to an agglomeration, a particle size of from 20 to 40 nm becomes a lump of from 100 to 200 µm. Further, a method of coating with carbon is well known as a means for an antioxidation, but after all it becomes to deteriorate properties of CVD that impurities are not contained. In view thereof, the present invention restricts an oxidation and agglomerate after a synthesis using a liquid phase method, and conducts a fluorine treatment.

As a means for forming a fluorine compound in the layer form on surfaces of FeCo-based particles, a surface treatment can be used. The surface treatment is a means in which a treating solution of a fluorine compound containing one or more kind of a rare earth element is prepared and it is coated on soft magnetic particles. The treating solution requires the following properties. (1) An amount of oxides produced on magnetic power surfaces is restricted to the utmost. (2) A wettability between magnetic powders used and the treating solution is high. (3) A coverage of a treating film to the magnetic powders used is high, and an adhesive property between the magnetic powders and a treating material is high. (4) A thickness of a treating film is uniform. (5) A high temperature stability of the treating film is high.

The treating solution satisfying these conditions can be prepared by the following procedures. First, hydrofluoric acid diluting a compound dissolving a water-soluble rare-earth salt in water is added to form a fluorine compound in the gel form. Next, the fluorine compound in the gel form is pulverized with an ultrasonic agitator in an alcohol solvent, a supernatant is disposed by conducting a centrifugal separation. The supernatant contains water or an ionic component which facilitates an oxidation of soft magnetic particles, and thus the supernatant is necessary to be removed as much as possible. Additionally, in respect to a coating of the treating solution, it is necessary to diminish, to the utmost, an amount of the treating solution added to the magnetic powders per one time at a degree that the treating solution gets wet on whole surfaces of the magnetic powders, in order that the treating film formed does not fall away. Then, it is permeate-mixed with hard magnetic particles or slurry and heated at from 200° C. to 400° C. to remove a solvent, but it is necessary to conducting a grinding in vacuum (under a reduced pressure of $1\times10^{-5}$ torr) during them. Without this grinding, the soft magnetic particles are agglomerated and a dispersibility after sintering is lowered.

TbF based rare earth fluoride particles are used in the present invention. Products prepared by coating a TbF based film on FeCo-based particles having a particle size of from 30 to 50 nm produced by a CVD method (commercially available and forming a lump of from 100 to 200 µm due to an agglomerate) and heat-treating at 1050° C. have saturation magnetizations of 211 emu/g in $Fe_{70}Co_{30}$ and 218 emu/g in $Fe_{50}Co_{50}$. In the meantime, it is reported that in case an oxide such as $SiO_2$, $ZrO_2$ and $Al_2O_3$ is solution-treated on surfaces of $Fe_{50}Co_{50}$ nano-particles having a particle size 50 nm, a saturation magnetization is 205 emu/g at maximum, and it is already confirmed that FeCo-based particles coating TbF based film have a value exceeding values of saturation magnetization of the conventional FeCo nano-particles coat-treated with an insulating layer.

As a means for forming a rare earth fluorine compound in the layer form on surfaces of FeCo-based particles, a method of charging a rare earth salt and a fluorinating agent in the synthesis by a liquid phase method can be used. In this case, it is necessary to grow FeCo-based particles to a certain degree and then to charge the rare earth salt and the fluorinating agent to grow a rare earth fluorine compound phase. This means grows the rare earth fluorine compound phase on the surfaces of soft magnetic particles in a solution, and thus a film thickness of a coating film and a coverage of each particle can be uniformly controlled.

Example 1

Precursors used are iron II chloride tetrahydrate $(Fe(Cl)_2 \cdot 4H_2O)$ as a Fe salt, and cobalt (II) acetate tetrahydrate $(Co(CH_3COO)_2 \cdot 4H_2O)$ as a Co salt. A reducing agent used is ethylene glycol (EG). EG can be used as a solvent. EG is dehydrated with molecular sieves so as to have a water content of about 50 ppm. EG can be converted into acetaldehyde by a dehydration reaction such as $2C_6H_6O_2 \rightarrow C_2H_4O + 2H_2O$. Acetaldehyde can be condensed to form a diacetyl as in $2C_2H_4O \rightarrow C_4H_6O_2 + H_2$, and electrons are generated on this occasion. Metal ions are reduced by these electrons to obtain metal particles. In the meantime, it is known that a formation of an aldehyde group is promoted by an addition of NaOH, and thus NaOH is added. Further, dimethylamine-borane $((CH_3)_2NH \cdot BH_3)$ was added as a reducing agent. In this Example, EG of 300 ml, a Fe complex of 0.008 mol/L, a Co complex of 0.002 mol/L, NaOH of 0.2 mol/L and dimethylamine-borane of 0.001 mol/L are used, and are kept warm at 140° C. in a magnetic field of from 300 to 500 mT for 7 hours. A temperature is raised from room temperature up to 120° C. over 1 hour. After keeping warm for 7 hours, benzotriazole $(C_6H_5N_3)$ of 0.02 mol/L as a volatile corrosion inhibitor was charged to EG, and kept warm for further 1 hour. After synthesizing particles, they are washed by substituting a few times by using methanol dehydrated with molecular sieves, and a slurry, containing FeCo alloy particles methanol mixed in which phases of bcc having a minor axis of from 10 to 20 nm and a major axis of from 50 to 200 nm and a slight amount of fcc are mixed, is obtained.

FIG. 1 shows a scanning electron microscopic picture of FeCo alloy particles prepared by heat-drying a slurry. A fluoride solution is mixed with the slurry containing these FeCo-based particles. The fluoride solution was prepared by dissolving $Tb(CH_3COO)_3 \cdot 4H_2O$ in water, gradually adding a diluted hydrofluoric acid (HF), and then stirring a solution containing a precipitated gel by using an ultrasonic agitator. This was subjected to a centrifugal separation to remove a supernatant, and then methanol is added to be stirred to prepare a treating solution. This solution was added so that an amount of TbF based film coated is 2 wt % relative to the above FeCo based particles, to be penetrate-mixed in a weight ratio of 1:10 to $(Nd_{0.7}Dy_{0.3})_2Fe_{14}B$ powders as a hard magnetic material.

The composite magnetic material thus prepared was temporarily foamed in a magnetic field, and then a solvent was removed. After a sintering (900° C.) and an aging treatment and a rapid cooling (at a cooling speed of 20° C./second at a temperature near 500° C.), a magnetization was achieved to a magnetic field applying direction in the molding in a magnetic field obtain a sintered magnet.

At a crystal grain boundary, a fluorine-containing phase or an oxide such as TbOF, NdOF, and $NdF_2$ and a rare earth rich phase containing Fe and Co are formed. At a grain boundary vicinity of $(Nd_{0.7}Dy_{0.3})_2Fe_{14}B$, it was observed that Tb was unevenly distributed. At a grain boundary phase between FeCo-based particles and a sintered body $(Nd_{0.7}Dy_{0.3})_2Fe_{14}B$ $(Nd_2Fe_{14}B$ based particles), from 0.2 to 50% of Fe and from 0.1 to 50% of Co in average are confirmed.

The grain boundary phase is a phase containing a fluorine or the above oxide. When Fe or Co contents of the grain boundary phase are less than 0.1%, a magnetic coupling between $(Nd_{0.7}Dy_{0.3})_2Fe_{14}B$ $(Nd_2Fe_{14}B$ based particles) and FeCo-based particles becomes weak, and thus residual magnetic flux density is not increased. When Fe or Co exceeding 50% are contained in the above grain boundary phase, the grain boundary phase shows soft magnetic-like magnetic properties and a coercive force is remarkably lowered, and thus 50% or less is desired.

Un uneven distribution of Tb at a grain boundary vicinity increases a crystal magnetic anisotropy energy of a main phase $((Nd_{0.7}Dy_{0.3})_2Fe_{14}B)$, a coercive force is increased, and a flux reversal is restricted due to a ferromagnetic coupling to a FeCo alloy phase of the crystal grain boundary. In case 0.2% Fe and 0.1% Co in average are contained at the grain boundary phase between $(Nd_{0.7}Dy_{0.3})_2Fe_{14}B$ and the FeCo-based particles, an enhancement of magnetic properties was observed as compared to $(Nd_{0.7}Dy_{0.3})_2Fe_{14}B$. As compared to a sintered magnet composed of a composite magnetic material prepared by coating, by a same procedure, a rare earth fluorine compound on FeCo-based particles having a particle size of from 30 to 50 nm (commercially available product) prepared by a CVD method, it was confirmed that 1.5 T of a residual magnetic flux density was increased to 1.7 T. In the meantime, 17.8 kOe of coercive force was slightly increased to 18.3 kOe. Curie temperature was from 550 to 780° C., which was not observed to be changed.

TABLE 1

| | Ferrite component | | FeCo component | |
|---|---|---|---|---|
| State of FeCo | $Fe_3O_4$ (311) | $Fe_2O_3$ (104) | (BCC) (211) | (FCC) (220) |
| A. FeCo synthesized by liquid phase method | — | 4 | 95 | 1 |
| B. FeCo heat-treated at sintering temperature after coating rare earth fluoride treating solution on A | — | — | 99 | 1 |

Figure 3:
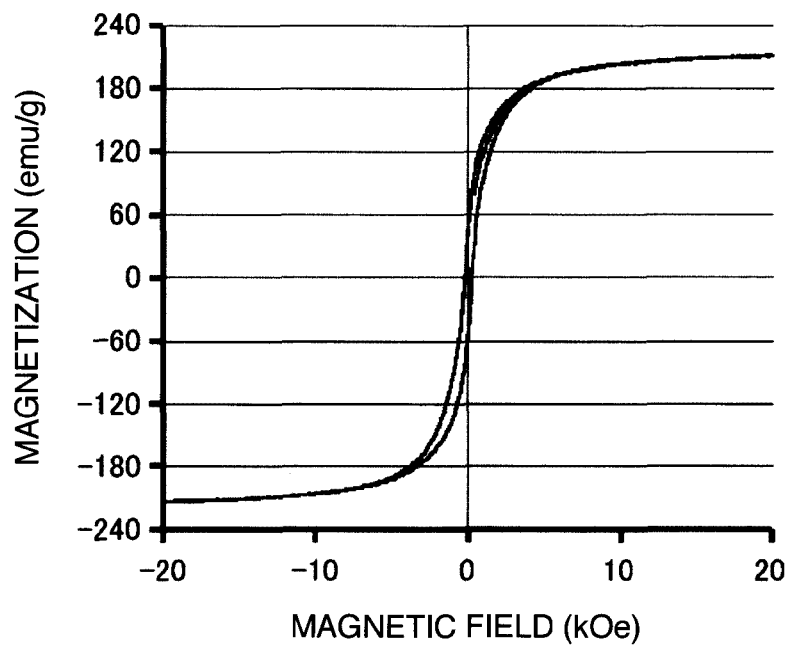
FIG. 3 is a hysteresis curve of FeCo-based particles obtained at Example 1.

FIG. 3 shows a hysteresis curve of FeCo-based particles. Table 1 shows integrated intensity ratios of main peaks calculated from X-ray diffraction patterns of FeCo-based particles. According to the above methods, in a simple substance of the soft magnetic particles coating a rare earth fluoride, a magnetic flux saturation density became 209 emu/g and a crystal structure became bcc. Fe:Co weight ratio was Fe:Co=67:33 according to an energy dispersive X-ray fluorescence analysis. Non-magnetic component derived from the solution, which was not washed away with the washing, was from 5 to 9 wt % of a total according to an atomic absorption analysis. One hundred particles had an aspect ratio of from 15 to 50 determined according to an image of a transmission electron microscope, and a coefficient of variation of a major axis was about 0.15. In the meantime, Fe salt and Co salt can be substituted with iron (II) sulfate heptahydrate ($FeSO_4 \cdot 7H_2O$), iron (III) nitrate nonahydrate ($Fe(NO_3)_3 \cdot 9H_2O$), cobalt (II) nitrate hexahydrate ($Co(NO_3)_2 \cdot 6H_2O$), cobalt (II) acetylacetonato dehydrate ($Co(C_5H_7O_2)_2 \cdot 2H_2O$) and the like, respectively. The solution can be substituted with glycols such as propylene glycol ($C_3H_8O_2$), diethylene glycol ($C_4H_{10}O_3$), trimethylene glycol ($C_6H_{14}O_4$). The volatile corrosion inhibitor used can include thiazole, imidazole, triazole, pyrrole, and pyrazole based nitrogen-containing heterocyclic rings.

The slurry containing the FeCo-based particles and the fluoride solution mixed used in the present Example contains the FeCo-based particles in an amount of from 1 to 50 wt % and the rare earth fluoride particles in an amount of from 0.001 to 10 wt % in an alcohol solvent, in which the FeCo-based particles have a particle size of from 20 to 200 nm and the rare earth fluoride particles have a particle size of from 1 to 50 nm. The present slurry is mixed with $Nd_2Fe_{14}B$-based powder and sintered after molding in a magnetic field to be able to increase all of a residual magnetic flux density, a coercive force and a maximum energy product.

Next, the technical specification of the above slurry is explained. When an amount of the FeCo-based particles is less than 1 wt %, an amount of a magnetic phase component having a saturation magnetization higher than a saturation magnetization of $Nd_2Fe_{14}B$-based powder becomes small, and thus it becomes difficult to increase a residual magnetic flux density. When an amount of the FeCo-based particles is more than 50 wt %, a magnetic field direction in the provisional molding becomes turbulent depending upon an alignment of the FeCo-based particles, and a turbulence occurs in an orientation of the $Nd_2Fe_{14}B$-based powder, and thus a squareness property of a demagnetization curve is lowered. Thus, it is desired that a concentration of the FeCo-based particles is from 1 to 50 wt %.

When a content of the rare earth fluoride particles in the above slurry is less than 0.001 wt %, they are unevenly distributed to run short of a rare earth element contributing to an increase of a coercive force, and an increase of a coercive force is not recognized. 0.001 wt % TbF based particles can increase 1 kOe of a coercive force. When exceeding 10 wt %, a tendency to lower a maximum energy product is recognized because a non-magnetic compound such as an acid fluoride is likely to be formed.

When the particle size of the FeCo-based particles in the above slurry is less than 20 nm, an agglomeration of the particles is inevitable, and a magnetic coupling with $Nd_2Fe_{14}B$-based powder becomes small to lower a residual magnetic flux density. When Co is from 0.1 to 50% in a range of from 20 to 200 nm, a residual magnetic flux density is increased by a range of from 0.01 to 0.3 T. When the particle size of the FeCo-based particles exceeds 200 nm, a thickness of rare earth fluoride particles coated on a surface becomes thick and a magnetostatic coupling with $Nd_2Fe_{14}B$-based powder becomes weak, and thus a coercive force becomes small. Thus, it is desired that the particle size of the FeCo-based particles is form 20 to 200 nm. A structure of the FeCo-based particles is a crystal of fcc structure or bcc.

When the particle size of the rare earth fluoride particles in the above slurry is less than 1 nm, an acid fluoride easily grows and it becomes difficult for the rare earth element to diffuse from the acid fluoride to the grain boundary vicinity, and thus a coercive force increase effect becomes small. When exceeding 50 nm, the rare earth element gets centered on a grain boundary triple point and it becomes difficult to unevenly distribute the rare earth element in the slurry along the grain boundary. Thus, it is desired that the particle size of the rare earth fluoride particles in the slurry is from 1 to 50 nm. In the rare earth fluoride particles, an amorphous component in an amount of from 1% to 90% is mixed with a fluoride crystal. In order to secure a fluidity, it is necessary to contain an amorphous in an amount of 1% or more. When containing an amorphous in an amount of more than 90%, a structure of the fluoride becomes unstable and thus it is difficult stabilize the technical specification of the slurry. Thus, the slurry is preferably an alcoholic solution comprising amorphous rare earth fluoride particles and crystalline FeCo-based particles mixed with together.

The above slurry has a fluidity, and can be coated and diffused on a surface of a sintered magnet block other than a mixing step with $Nd_2Fe_{14}B$-based powder. It can be a liquid, in which minute particles such as a colloid of a material same as above are uniformly distributed, rather than a non-uniform mixture of solid particles with a liquid such as a slurry.

In a mixed solution such as the above slurry or colloid, FeCo-based particles and rare earth fluoride particles are mixed with each other, a rare earth fluoride particle film grows on a part of FeCo-based particle surface. When the particle size of the FeCo-based particles is larger than the particle size of the rare earth fluoride particles, the rare earth fluoride particles form a grain boundary having a width smaller than the FeCo-based particle size, and the rare earth element is unevenly distributed at a grain boundary vicinity to increase a residual magnetic flux density and a coercive force. When the solution or a dried solution is subjected to a X-ray diffraction measurement, a diffraction peak half value width of the FeCo based crystal becomes smaller than a diffraction peak half value width of the rare earth fluoride particles. This shows that a crystallite of the FeCo based crystal is larger than a crystallite of the rare earth fluoride particles, and a maximum energy product and a coercive force can be increased by preparing the $Nd_2Fe_{14}B$ based sintered magnet by using such a solution.

In this mixed solution, when the particle size of the FeCo-based particles is same as or less than the particle size of the rare earth fluoride particles, an acid fluoride is likely to grow on a surface of the FeCo-based particles and the surface of the FeCo-based particles is likely to be oxidized, and thus a magnetization is likely to be decreased, a coercive force tends to be increased but a residual magnetic flux density is decreased. Thus, a maximum energy product is also decreased.

Example 2

To EG of 300 ml, iron II chloride tetrahydrate ($Fe(Cl)_2 \cdot 4H_2O$) of 0.045 mol/L and cobalt II acetate tetrahydrate ($Co(CH_3COO)_2 \cdot 4H_2O$) of 0.005 mol/L and NaOH of 0.2 mol/L were added. Temperature was raised from room temperature up to 140° C. over 1 hour, and kept warm at 140° C. for 3 hours. Then, in order to avoid a formation of a hydroxide such as $[Fe(H_2O)_6]^{2+}$ and $[Fe(H_2O)_4(OH)_2]$, 2,2'-bipyridyl ($C_{10}H_8N_2$) of 0.02 mol/L was added. When it was cooled to room temperature, red particles were precipitated. They were washed with water to detach a bipyridyl ligand. Thereby, magnetite having a minor axis of from 20 to 50 nm and a major axis of from 0.5 to 2.0 μm is obtained.

Figure 2:
FIG. 2 is a scanning electron microscopic picture of FeCo-based particles obtained at Example 2.

FIG. 2 shows a scanning electron microscopic picture of the FeCo alloy particles. The FeCo-based particles having a bcc structure were obtained by aging the above magnetite at 300° C. in a hydrogen atmosphere. Rare earth fluoride particles were coated onto the particles by the procedures described at Example 1 to obtain FeCo-based particles having a Curie point exceeding 900° C.

TABLE 2

| State of FeCo | Ferrite component | | FeCo component | |
|---|---|---|---|---|
| | $Fe_3O_4$ (311) | $Fe_2O_3$ (104) | (BCC) (211) | (FCC) (220) |
| A. FeCo synthesized by liquid phase method | 100 | — | — | — |
| B. FeCo heat-treating A at 300° C. in hydrogen atmosphere | — | — | 100 | — |
| C. FeCo heat-treated at sintering temperature after coating rare earth fluoride treating solution on B | — | — | 100 | 1 |

Figure 4:
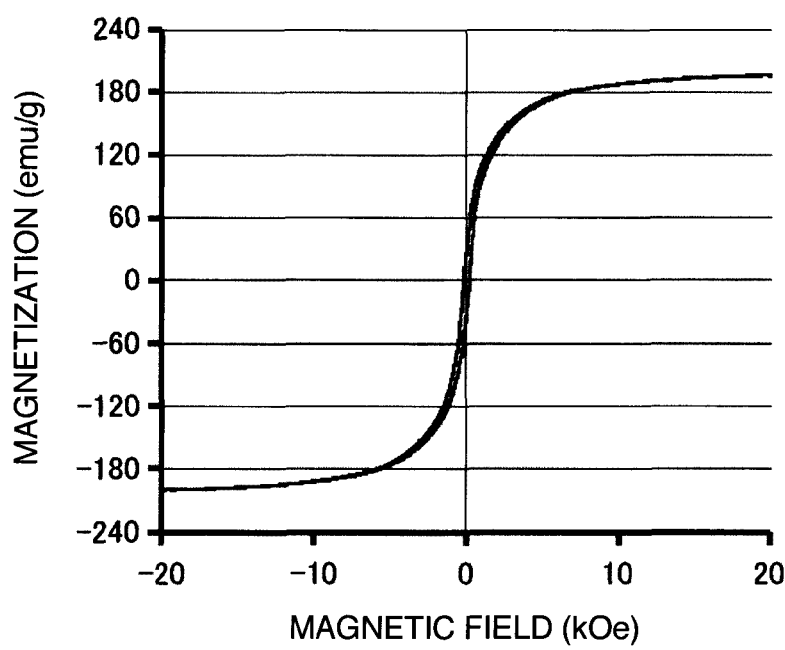
FIG. 4 is a hysteresis curve of FeCo-based particles obtained at Example 2.

FIG. 4 shows a hysteresis curve of FeCo-based particles. Table 2 shows integrated intensity ratios of main peaks calculated from X-ray diffraction patterns of FeCo-based particles. A magnetic flux saturation density became 195 emu/g and a crystal structure became BCC. Fe:Co weight ratio was Fe:Co=70:30 according to an energy dispersive X-ray fluorescence analysis. Non-magnetic component derived from the solution, which was not washed away with the washing, was from 11 to 15 wt % of a total according to an atomic absorption analysis. One hundred particles had a coefficient of variation of about 0.13 and an aspect ratio of from 5 to 30 determined according to an image of a transmission electron microscope. It was confirmed that the sintered magnet prepared by the procedures described at Example 1 had similar coercive force and Curie temperature but an increased residual magnetic flux density of 16.5 T, as compared to the commercially available product.

Example 3

Precursors used are iron (III) acetylacetonato ($Fe(C_5H_7O_2)_3$) of 0.07 mol/L as a Fe salt, and cobalt (II) acetylacetonato ($Co(C_5H_7O_2)_2$) of 0.03 mol/L as a Co salt. A solvent added is phenyl ether ($C_{12}H_{10}O$) of 100 ml, a protecting agent added is oleyl amine ($C_{18}H_{37}N$) of 5 ml and oleyl acid ($C_{18}H_{34}O_2$) of 6 ml, and a reducing agent added is 1,2-hexadecanediol ($C_{16}H_{34}O_2$) of 0.15 mol/L. In the synthesis, a magnetic field of from 300 to 500 mT was applied, kept warm at 240° C. for 1 hour with allowing Ar as a carrier gas to flow in, and then $Tb(CH_3COO)_3 \cdot 4H_2O$ and ammonium fluoride of 0.01 mol/L and 0.015 mol/L, respectively, were charged to further keep warm for 2 hours. Thereby, FeCo based particles, which have a BCC structure and a minor axis of about 20 nm and a major axis of about 0.5 μm and coat TbF, were obtained. Curie point exceeds 900° C., and a magnetic flux saturation density became 172 emu/g. Fe:Co weight ratio was Fe:Co=65:35 according to an energy dispersive X-ray fluorescence analysis. Non-magnetic component derived from the solution, which was not washed away with the washing, was from 21 to 26 wt % of a total according to an atomic absorption analysis. One hundred particles had a coefficient of variation of about 0.7 and an aspect ratio of from 20 to 70 determined according to an image of a transmission electron microscope. It was confirmed that the sintered magnet prepared by the procedures described at Example 1 had a similar Curie temperature but an increased residual magnetic flux density of 1.62 T and an increased coercive force of 18 kOe, as compared to the commercially available product.

The present invention can be also used as a material of an electromagnetic wave absorber used for protecting, against a high frequency, electronic equipments, which are used for a cellular phone, a television, a marine vessel and an airplane. Electromagnetic wave absorptance at a high frequency (>GHz) has the following relationship with a magnetic permeability at a high frequency.

Electromagnetic wave absorptance of magnetic loss material=½·$Im(\mu) \times \omega \times |H|^2$ μ [H/m]: magnetic permeability of material
ω [$sec^{-1}$]: angular velocity of electromagnetic wave
H [A/m]: magnetic field strength of radiation electromagnetic field The characteristics of the FeCo-based particles of the present invention contribute to the following respective parameters. (1) A high magnetic flux saturation density by a use of a metal based material having a BCC structure having a small amount of a ferrite component. (2) High frequency of a resonance frequency by a magnetic shape anisotropy magnetic field due to a high aspect ratio. (3) A decrease of a skin effect by a decrease of a thickness of particles. (4) An enhancement of frequency characteristics by a diminution of a ferrite component (having no resonance peaks at a low frequency portion) and a uniform shape of particles. Thus, it is understood that the present invention obtains a high magnetic permeability good in frequency characteristics and is also useful as an electromagnetic wave absorber for a high frequency (>GHz).

Other objects, features and advantages of the invention will become apparent from the following description of the embodiments of the invention taken in conjunction with the accompanying drawings.

The invention claimed is:

1. An alcoholic solution comprising FeCo-based particles and rare earth fluoride particles mixed together,
   wherein particle diameters of said FeCo-based particles are larger than particle diameters of said rare earth fluoride particles,
   particle diameters of said FeCo-based particles are from 20 to 200 nm, and
   particle diameters of said rare earth fluoride particles are from 1 to 50 nm,
   and wherein from 1 to 90% of said rare earth fluoride particles are amorphous.

2. The alcoholic solution according to claim 1, comprising said FeCo-based particles in an amount of from 1 to 50 wt % and said rare earth fluoride particles in an amount of from 0.001 to 10 wt %.

3. The alcoholic solution according to claim 2, wherein said FeCo-based particles are crystalline.

4. The alcoholic solution according to claim 1, wherein said FeCo-based particles are crystalline.

5. A sintered magnet which is produced by mixing and sintering $Nd_2Fe_{14}B$-based powder and the alcoholic solution according to claim 1.

6. The sintered magnet according to claim 5, wherein the sintered magnet has Fe in amount of from 0.2 to 50% and Co in amount of from 0.1 to 50% at a grain boundary phase between the $Nd_2Fe_{14}B$-based particles and the FeCo-based particles.

* * * * *